(12) United States Patent  
Kim (10) Patent No.: US 7,538,843 B2
(45) Date of Patent: May 26, 2009

(54) LIQUID CRYSTAL DISPLAY AND METHOD OF FABRICATING THE SAME HAVING PARTICULAR DATA SIGNAL TRANSMISSION LINES

(75) Inventor: Dong-Gyu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 580 days.

(21) Appl. No.: 11/431,376

(22) Filed: May 10, 2006

(65) Prior Publication Data

US 2007/0064190 A1  Mar. 22, 2007

(30) Foreign Application Priority Data

Sep. 12, 2005  (KR)  ....................... 10-2005-0084740

(51) Int. Cl.
*G02F 1/1343* (2006.01)
(52) U.S. Cl. ........................ 349/139; 349/142; 349/143
(58) Field of Classification Search ................. 349/139, 349/142, 143
See application file for complete search history.

(56) References Cited

U.S. PATENT DOCUMENTS

| | | | | |
|---|---|---|---|---|
| 6,392,354 | B1 * | 5/2002 | Matsueda | 315/169.1 |
| 2006/0187386 | A1 * | 8/2006 | Roh | 349/114 |
| 2008/0224978 | A1 * | 9/2008 | Park | 345/92 |
| 2008/0291347 | A1 * | 11/2008 | Kim et al. | 349/33 |

* cited by examiner

*Primary Examiner*—Mike Qi
(74) *Attorney, Agent, or Firm*—F. Chau & Associates, LLC (57) ABSTRACT

A liquid crystal display includes gate lines, data lines intersecting with the gate lines to define sub-pixels, and a transmission part including transmission lines connected with the data lines to transmit data signals, where at least one pair of the transmission lines are arranged to cross each other, some of the transmission lines cross each other so that a sequence of data signals applied to the data lines can be changed, any of the transmission lines is opened at a crossing point of the transmission lines and the opened portion is connected by a separate conductor, thereby insulating the transmission lines crossing each other from each other, and an additional process for connecting the opened portion is not needed, thereby simplifying a fabrication process for the liquid crystal display.

20 Claims, 9 Drawing Sheets

LIQUID CRYSTAL DISPLAY AND METHOD OF FABRICATING THE SAME HAVING PARTICULAR DATA SIGNAL TRANSMISSION LINES

CROSS-REFERENCE TO RELATED APPLICATION

This application claims foreign priority under 35 U.S.C. § 119 to Korean Patent Application No. 2005-84740, filed on Sep. 12, 2005, the contents of which are herein incorporated by reference in their entirety.

BACKGROUND OF THE INVENTION

1. Field of the Invention

The present disclosure relates to flat panel displays, and more particularly, to liquid crystal displays (LCDS) and methods of fabricating LCDs.

2. Description of the Conventional Art

A flat panel display (FDP) generally has a slim profile and provides a flat picture. One type of flat panel display is a liquid crystal display (LCD), which is widely used as a monitor of a notebook computer and the like. The LCD includes two substrates attached to each other, and a liquid crystal layer interposed between the two substrates. By applying different voltages to the two substrates, respectively, an electric field is formed. When the electric field is applied to the liquid crystal layer, liquid crystal molecules of the liquid crystal layer are re-aligned to vary a light transmittance of the liquid crystal layer, so that a desired image is displayed.

On a lower substrate of the two substrates, a plurality of pixels is regularly arranged. Each of the pixels includes a main pixel and a sub pixel. The sub pixel is to express colors. The sub pixels corresponding to a number of basic colors constitute a single main pixel. For example, when red (R), green (G) and blue (B) colors corresponding to three primary lights are used, a single main pixel includes three sub-pixels corresponding to the respective colors. Alternatively, the single main pixel includes four sub-pixels further including a white sub-pixel so as to increase a transmittance efficiency. The above three color sub-pixels structure and the four color sub-pixels structure have a difference in operation as follows.

A plurality of gate lines and a plurality of data lines intersecting the plurality of gate lines are formed on the lower substrate of an LCD. Regions defined by the plurality of gate lines and the plurality of data lines intersecting each other correspond to the sub-pixels, each having a pixel electrode formed thereon. Data signals are applied to the data lines and transmitted to pixel electrodes, so that an electric field is applied to the liquid crystal molecules of the liquid crystal layer arranged on the pixel electrodes. Then, when the electric field is applied only in the same direction, the liquid crystal molecules are always inclined only in one direction due to a property of the liquid crystal, thereby deteriorating the liquid crystal molecules. To avoid such deterioration of the liquid crystal molecules, a positive (+) voltage and a negative voltage (−) are alternately applied to the pixel electrode. For the positive sub-pixels and the negative sub-pixels to be uniformly distributed, a data voltage with a different polarity is applied between sub-pixels adjacent to each other in a gate direction.

In the case of the three color sub-pixels structure, the sub-pixels arranged in the gate line direction are applied a data voltage with polarities, such as "red (+)/green (−)/blue(+)/red (−)/green(+)/blue(−) . . . ". In the case of the four color sub-pixels structure, the sub-pixels arranged in the gate line direction are applied a data voltage with polarities, such as "red (+)/green (−)/blue(+)/white(−)/red(+)/green(−)/blue(+)/white(−) . . . ".

In a case of the three color sub-pixels structure, the red sub-pixels are arranged with alternating positive polarity and negative polarity, whereas in a case of the four color sub-pixels structure, the red sub-pixels are arranged all only with the positive polarity. In other words, in the three color sub-pixels structure, since a number of the sub-pixels constituting the main pixel is an odd but the types of the polarity are two, their polarity correspondence is changed. In other words, the red sub-pixels have both the positive polarity and the negative polarity. In the four color sub-pixels structure, since the number of the sub-pixels constituting the main pixel is an even and the types of the polarity are two, their correspondence is not changed. In other words, the red sub-pixels have only one polarity in a specific frame.

When the sub-pixels of a specific color have only one polarity, an image display quality is lowered. In other words, while the polarity of the pixel electrode is periodically inverted from the positive polarity to the negative polarity or vice versa, the light transmittance of the liquid crystal layer is varied against the two polarities. For instance, in a case where only the red color is displayed, when a positive voltage is applied to all the red sub-pixels in a present frame and a negative voltage is applied to all the red sub-pixels in a next frame, a flicker occurs due to a transmittance difference between the opposite polarities during an inversion operation. Further, when only the positive voltage is applied to the sub-pixels, a voltage applied to the upper substrate is distorted. Thus, the electric field applied to the liquid crystal is greater or less than that in an ideal circumstance, thereby deteriorating the image display quality.

SUMMARY OF THE INVENTION

The present disclosure provides a liquid crystal display having an improved display quality. The present disclosure also provides a method suitable for fabricating the liquid crystal display.

An embodiment of the present disclosure provides a liquid crystal display including: a plurality of gate lines and a plurality of data lines formed to cross each other on a substrate and to define a plurality of sub-pixels; and a transmission part including a plurality of transmission lines connected with the plurality of data lines to transmit a data signal, at least one pair of the plurality of transmission lines being arranged to cross each other.

By using the transmission lines crossing each other, data signals generated in a data driver can be transmitted to the data lines in a changed sequence. For example, though data signals are generated in a sequence of positive polarity and negative polarity, the data signals can be transmitted to the data lines in a sequence of negative polarity and positive polarity, if desired.

The transmission part may include a first transmission part including at least one pair of transmission lines crossing each other and a second transmission part including at least one pair of transmission lines that do not cross each other. The first transmission part and the second transmission part may be alternatively arranged in a gate line direction at each main pixel including the plurality of sub-pixels. In other words, in case the main pixel consists of sub-pixels of red/green/blue/white and data signals having a sequence of positive polarity and negative polarity that are alternatively generated from the data driver, a data signal having the positive polarity is transmitted to a first red sub-pixel from the first transmission part and a data signal having the negative polarity is transmitted to a second red sub-pixel from the second transmission part due to the transmission lines crossing each other. Thus, according to the present disclosure, data signals having the positive polarity and the negative polarity are uniformly transmitted to the sub-pixels having the same color, so that picture quality can be prevented from being lowered due to a concentration of the polarities toward a specific portion.

One pair of the transmission lines crossing each other should be insulated from each other, and any of one pair of the transmission lines is partially opened at a crossing point of one pair of the transmission lines. The opened portion can be connected by forming a separate conductor on the insulating layer on the transmission lines. An embodiment of the present disclosure can use a transparent conductive layer for forming a pixel electrode so as to form the conductor instead of adding a separate conductive layer.

Another embodiment of the present disclosure provides a method of fabricating a liquid crystal display. The method includes: forming a plurality of gate lines on a substrate; forming a plurality of data lines crossing the plurality of gate lines on the substrate; and forming a plurality of transmission lines connected with the plurality of data lines, at least one pair of the plurality of transmission lines being arranged to cross each other.

The plurality of transmission lines may include one pair of transmission lines crossing each other and one pair of transmission lines that do not cross each other, and one pair of the transmission lines crossing each other and one pair of the transmission lines that do not cross each other are uniformly arranged. The plurality of data lines and the plurality of transmission lines are simultaneously formed by depositing and patterning a metal film. A pixel electrode is formed on the plurality of data lines and the plurality of transmission lines by patterning a deposited transparent conductive layer. The metal film is patterned such that any of one pair of the transmission lines crossing each other is partially opened at a crossing point of one pair of the transmission lines, and the transparent conductive layer is patterned such that the opened portion is connected. In this case, the plurality of transmission lines is formed while the plurality of data lines and the pixel electrode are formed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain principles of the disclosure. In the drawings:

FIGS. 7A through 10A and FIGS. 7B through 10B are cross-sectional views taken along the lines A-A' and B-B', respectively, of FIG. 1 and illustrate a method of fabricating an LCD according to an embodiment of the present disclosure.

DETAILED DESCRIPTION OF PREFERRED EMBODIMENTS

The present disclosure will now be described more fully with reference to the accompanying drawings, in which exemplary embodiments are shown. The invention may, however, be embodied in many different forms and should not be construed as being limited to the embodiments set forth herein; rather, these embodiments are provided so that this disclosure will be thorough and complete, and will fully convey the concepts of the invention to those of ordinary skill in the pertinent art. In the drawings, the shapes of elements may be exaggerated for clarity. Like reference numerals in the drawings may denote like elements.

Figure 1:
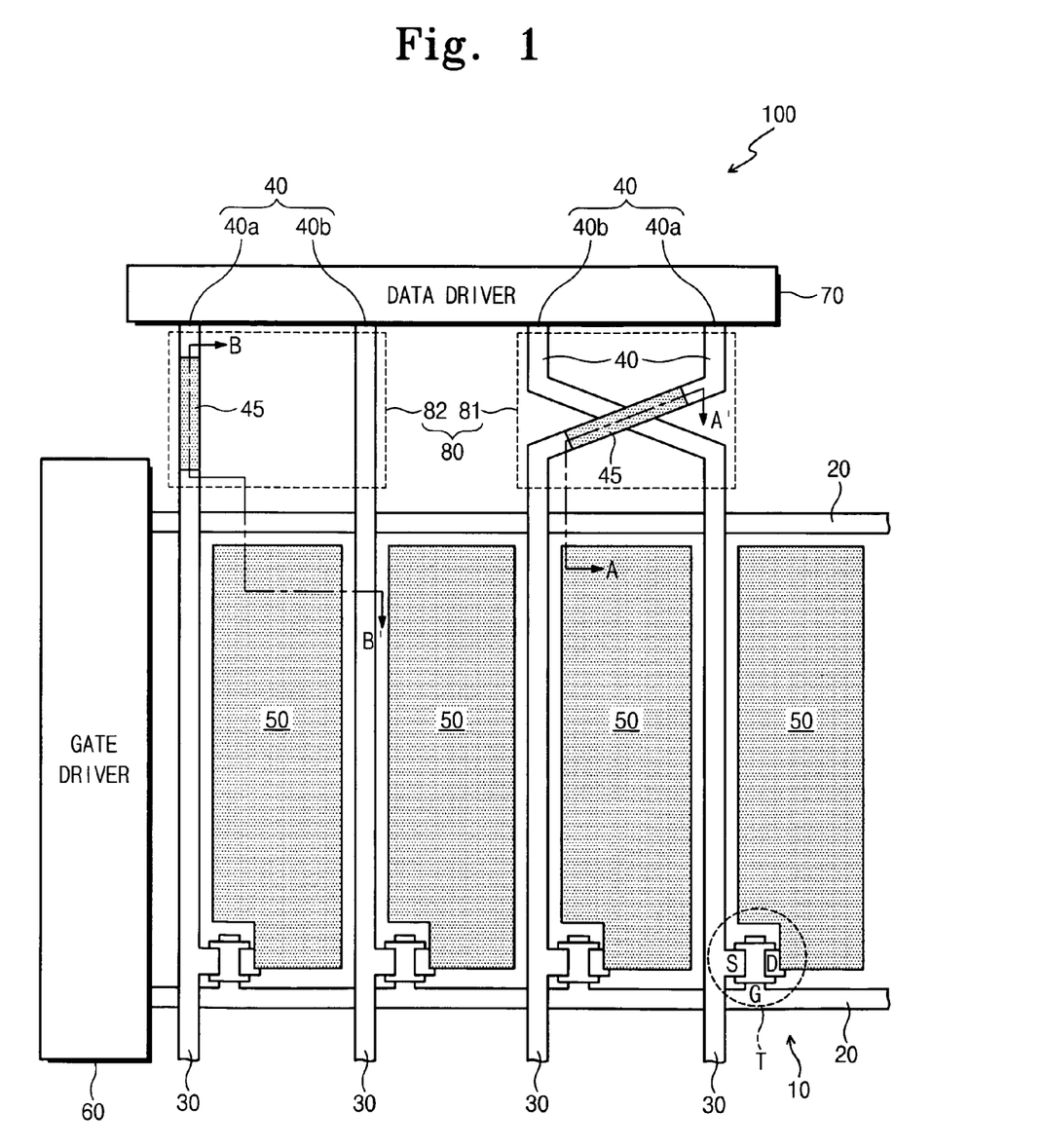
FIG. 1 is a plane view showing a liquid crystal display according to an embodiment of the present disclosure.

FIG. 1 is a plane view of a liquid crystal display (LCD) according to an embodiment of the present disclosure, indicated generally by the reference numeral 100.

Referring to FIG. 1, gate lines 20 and data lines 30 intersecting with the gate lines 20 are formed on a substrate 10. The gate lines 20 and the data lines 30 are generally arranged in a matrix configuration having a row direction and a column direction, respectively, to define a plurality of sub-pixel regions. Each of the sub-pixel regions has a sub-pixel formed therein. Thin film transistors 'T' and pixel electrodes 50, connected with the thin film transistors (T), are formed within the sub-pixel regions. Each of the thin film transistors 'T' includes a gate electrode 'G' branched from a corresponding gate line of the gate lines 20, a source electrode 'S' branched from a corresponding data line of the data lines 30, and a drain electrode 'D' spaced apart from the source electrode 'S' and electrically connected with a corresponding pixel electrode of the pixel electrodes 50.

Gate on signals are applied to the gate lines 20, respectively, and data signals according to image information are applied to the data lines 30, respectively. In other words, data signals applied to the data lines 30 may be applied to the pixel electrodes when the thin film transistors 'T' are turned on in response to the gate on signals.

Meanwhile, a substrate such as an upper substrate is separately disposed to face the substrate 10. The upper substrate has a common electrode to which a reference voltage is applied. Also, a liquid crystal layer is interposed between the pixel electrodes 50 and the common electrode, and an electric field is applied to the liquid crystal layer due to a voltage difference between a pixel voltage applied to the pixel electrodes 50 and the reference voltage applied to the common electrode.

Thus, while the LCD 100 operates, gate on signals and data signals are generated. For the generation of the gate on signals and data signals, the LCD 100 has a gate driver 60 and a data driver 70. The data driver 70 is connected with the data lines 30 by a transmission part 80. The transmission part 80 includes a plurality of transmission lines 40, which are provided outside a pixel area, in the same number as the number of the data lines 30, and connected with the data lines 30 on a one-to-one basis.

The transmission part 80 includes a first transmission part 81 and a second transmission part 82. The first transmission part 81 includes at least one pair of transmission lines 40 crossing each other, and the second transmission part 82 includes at least one pair of transmission lines 40 substantially parallel with the data lines 30. The second transmission part 82 transmits an n-th (where n is a natural number) data signal and an (n+1)-th data signal to the n-th data line and the (n+1)-th data line, respectively. The first transmission part 81 including the crossing transmission lines 40 transmits an n-th (where n is a natural number) data signal and an (n+1)-th data signal to the (n+1)-th data line and the n-th data line, respectively. Thus, the transmission part 80 including the crossing transmission lines 40 can be usefully used when it is required to change an overall aspect for applying the data signals to the data lines 30. Meanwhile, some of the transmission lines 40 are partially opened and the opened portion of the transmission lines 40 are connected with a conductor 45.

In cases where the data signals are generated alternating in the order of positive polarity and negative polarity by a dot inversion method or a column inversion method, positive/negative signals can be applied to the data lines 30 by properly using the crossing transmission lines 40. Although the above embodiment shows and describes that two transmission lines 40 are crossed, the number of the crossing transmission lines can be increased such that the sequence of applying data signals is changed with respect to more data lines 30. Since the data signals used in the LCDs have two types of polarities, i.e., positive polarity and negative polarity, an example of one pair of crossing transmission will now be described in detail.

Figure 2:
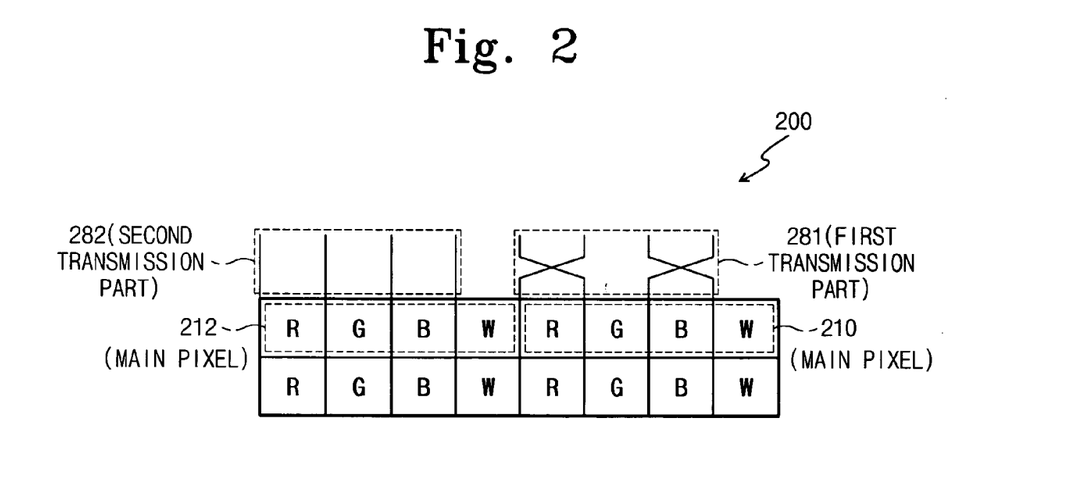
FIG. 2 is a view showing a striped pixel pattern of a liquid crystal display according to an embodiment of the present disclosure.

FIG. 2 is a view showing a striped pixel pattern of an LCD according to an embodiment of the present disclosure, indicated generally by the reference numeral 200. Referring to FIG. 2, sub-pixels are defined on a region formed by intersecting gate lines in a row direction, and data lines in a column direction. In the striped pixel pattern 200, the sub-pixels having the same colors are arranged in the column direction and the sub-pixels having the configuration of red (R)/green (G)/blue(B)/white(W) are repetitively arranged in the row direction. Four sub-pixels of red (R)/green (G)/blue(B)/white (W) arranged in the gate line direction constitute a main pixel. The first transmission part 281 and the second transmission part 282 are repetitively arranged in the row direction with respect to each main pixel. In other words, two pairs of the transmission lines 40 of FIG. 1 that cross each other are connected with respect to the first main pixel 210, and two pairs of the transmission lines 40 that do not cross each other are connected with respect to the second main pixel 212, and the above configuration is repeated.

Figure 3A:
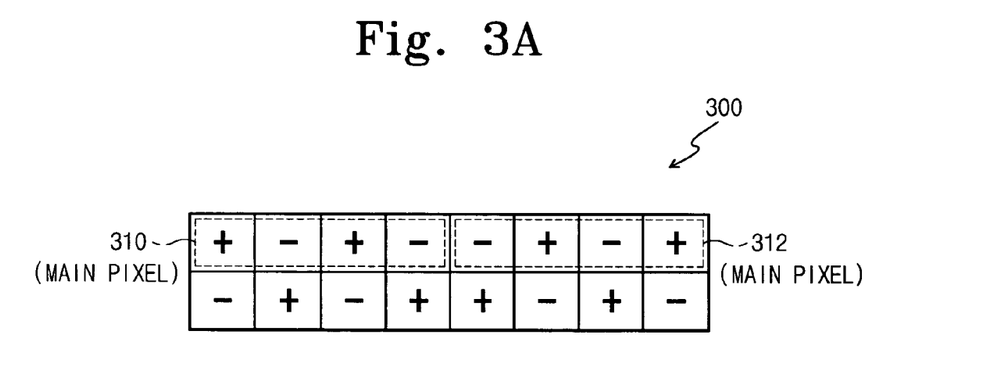
FIGS. 3A and 3B show a status that data signals are applied to the pixel configuration of FIG. 2 in a dot inversion driving method.
Figure 3B:
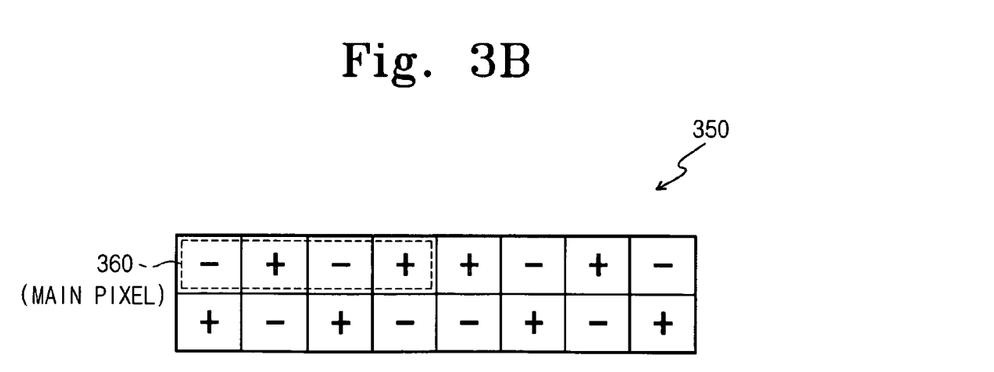

FIGS. 3A and 3B each show a status, indicated generally by the reference numerals 300 and 350, respectively, for data signals that are applied to the pixel configuration of FIG. 2 in a dot inversion driving method. The data driver 70 of FIG. 1 connected with the transmission part 80 of FIG. 1 alternatively generates the data signals having the positive polarity and the negative polarity, respectively, and in a next frame, generates the data signals having the negative polarity and the positive polarity, respectively.

Referring to FIG. 3A, in a case where the data signals having the alternate positive and negative polarities are generated, for example, "(+)/(−)/(+)/(−)/(+)/(−)/(+)/(−)/", a data signal having a polarity configuration of "(+)/(−)/(+)/(−)" is applied to a first main pixel 310 (represented by a dotted line) in a first row, and a data signal having a polarity configuration of "(−) (+)/(−)/(+)" is applied to a second main pixel 312 in the first row, which is because the sequence of the data signals is changed by the crossing transmission lines 40 of FIG. 1. In this case, for example, the red sub-pixel has the positive polarity in the first main pixel 310 but has the negative polarity in the second main pixel 312, so that the red sub-pixels are wholly distributed having the alternating positive and negative polarities. This configuration may alternately or additionally be applied to other color sub-pixels. Accordingly, the LCD can prevent the deterioration of picture display quality, such as flicker, for example.

A data signal having a polarity configuration of "(−)/(+)/(−)/(+)/(+)/(−)/(+)/(−)" is applied to sub-pixels in a second row according to 1×1 dot inversion method. In this case, the sub-pixels with the same color are wholly distributed having the alternate positive and negative polarities. If a column inversion driving method is applied to the LCD, the main pixel in the second row has the polarity configuration of "(+)/(−)/(+)/(−)/(−)/(+)/(−)/(+)", which is the same as that in the first row. In this case, the sub-pixels having the same color in the row direction can be distributed with alternate positive polarities and negative polarities.

FIG. 3B shows the next frame status 350. Referring to FIG. 3B, in the next frame, the main pixel 360 and respective sub-pixels have the opposite polarities, and the data signals having the uniform positive polarities and negative polarities are applied to the sub-pixels having the same color as a whole.

Figure 4:
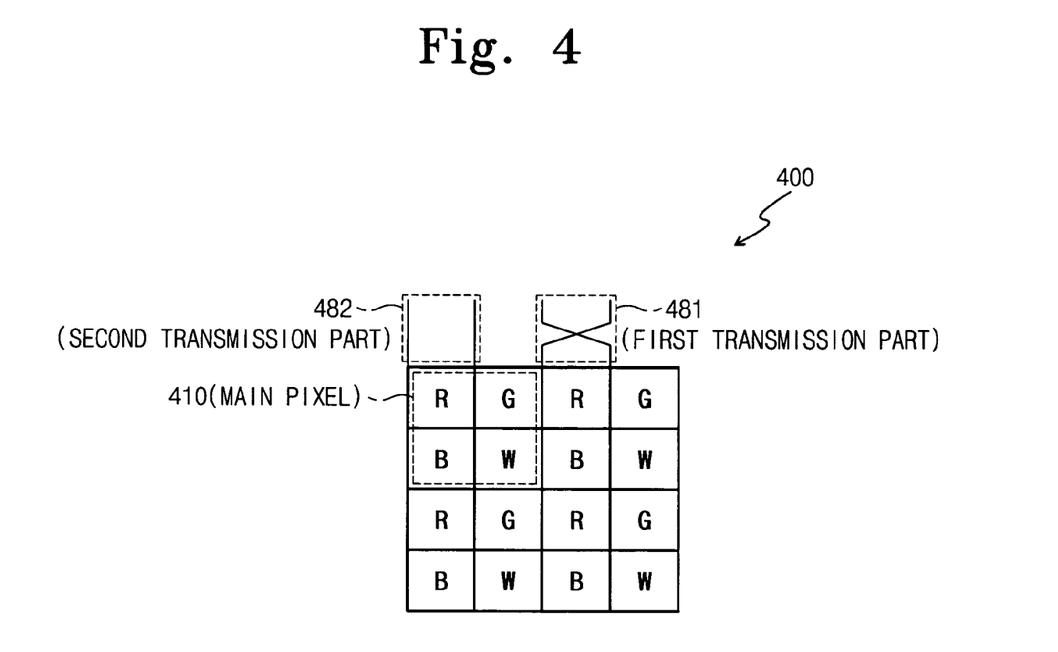
FIG. 4 is a view showing a checkered pixel pattern of a liquid crystal display according to another embodiment of the present disclosure.

FIG. 4 is a view showing a checkered pixel pattern, indicated generally by the reference numeral 400, in an LCD according to another embodiment of the present disclosure. Referring to FIG. 4, the sub-pixels are defined on region formed by intersecting the gate lines in a row direction and the data lines in a column direction. In the checkered pixel pattern, 2×2 sub-pixels arranged in a row direction and a column direction constitute a main pixel 410. In other words, the main pixel includes two sub-pixels in the first row and two sub-pixels in the second row. For example, only red (R) and green (G) sub-pixels are repetitively arranged in the first row, and only blue (B) and white (W) sub-pixels are repetitively arranged in the second row. A first transmission part 481 and a second transmission part 482 are repetitively arranged in the row direction with respect to each main pixel. In other words, one pair of transmission lines that do not cross each other are connected with respect to the first main pixel 410, and one pair of transmission lines crossing each other are connected with respect to the second main pixel, and the above configuration of the transmission lines is repeated.

Figure 5A:
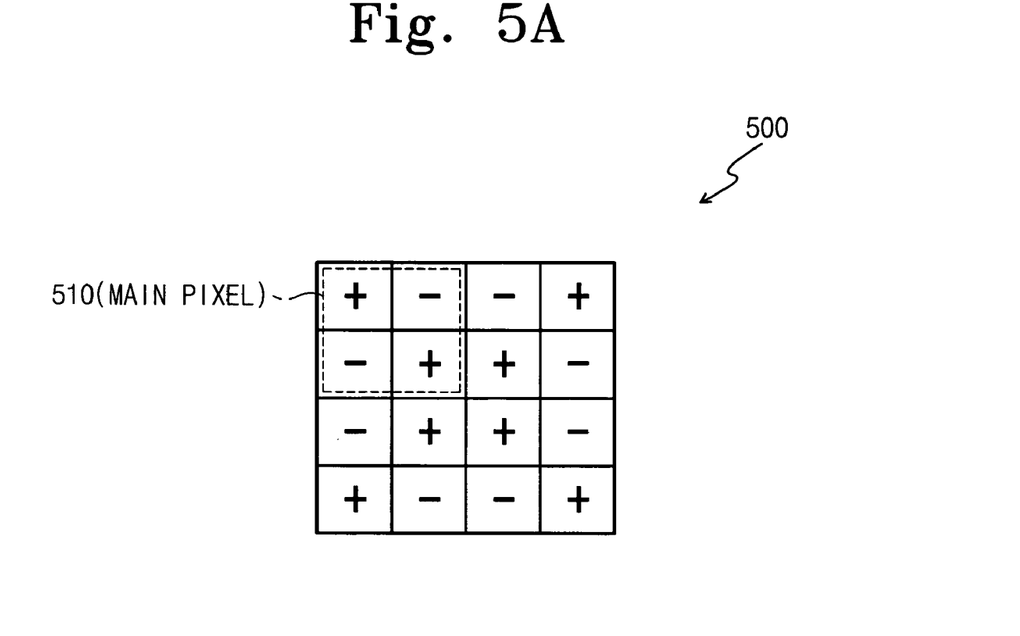
FIGS. 5A and 5B show a status that data signals are applied to the pixel configuration of FIG. 4 in a dot inversion driving method.
Figure 5B:
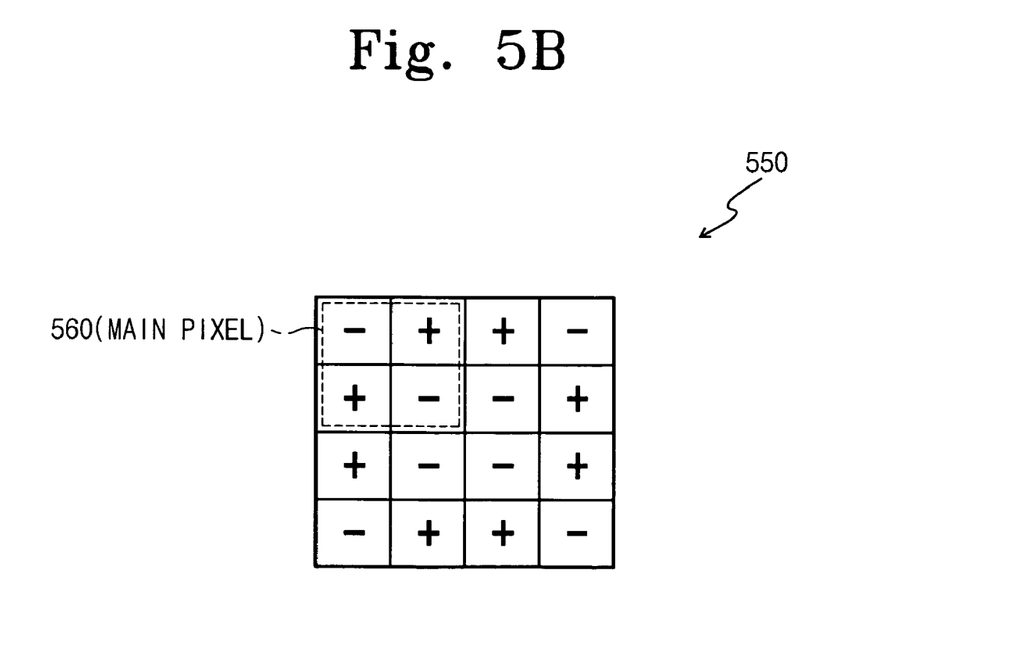

FIGS. 5A and 5B each show a status, indicated generally by the reference numerals 500 and 550, respectively, where data signals are applied to the pixel configuration of FIG. 4 in a dot inversion driving method. Referring to FIG. 5A, in case where the data signals having the alternate positive polarity and negative polarity are generated, for example, "(+)/(−)/(+)/(−)",the data signal having a polarity configuration of "(+)/(−)" is applied to a first main pixel 510 (represented by a dotted line) in a first row, and the data signal having a polarity configuration of "(−)/(+)" is applied to a second main pixel in the first row. Also, a data signal having a polarity configuration of "(−)/(+)" is applied to a first main pixel 510 in a second row according to 1×1 dot inversion method and a data signal having a polarity configuration of "(+)/(−)" is applied to a second main pixel in the second row. In this case, for example, red (R) sub-pixels are distributed to alternately have the positive and negative polarities in the gate line direction. This configuration may additionally or alternately be applied to other color sub-pixels. Thus, since the two types of polarities are uniformly applied to the sub-pixels, the LCD can prevent the deterioration of picture display quality, such as flicker. Herein, a data signal having the same order of the polarities as that in the second row is applied to a main pixel in a third row, which is due to the application of 2×1 dot inversion driving method. By the 2×1 dot inversion driving method, the data signals with the different polarities can be applied to the sub-pixels adjacent in the column direction and having the same color.

FIG. 5B shows the next frame status 550. Referring to FIG. 5B, in the next frame, the respective sub-pixels have the opposite polarities, and the data signals having the uniform positive polarities and negative polarities are applied to the main pixel 560 and sub-pixels having the same color as a whole.

As described above according to the present disclosure, data signals generated in the data driver are applied to the data lines in a changed sequence by changing the configuration of the transmission lines into the crossing configuration. In alternate embodiments, the above result can be achieved by modifying the design of the data driver without a structural change of the transmission lines. In other words, by changing the design of the data driver, it is possible to generate a data signal having the polarity configuration in the order of "R(+)/G(-)/B(+)/N(-)/R(-)/G(+)/B(-)/W(+)" in the gate line direction so as to be matched with the four color sub-pixel configuration, instead of generating the alternate positive and negative data signals in the gate line direction according to the conventional art. In this case, even in the four color sub-pixels configuration, a problem, such as flicker, can be avoided without any concentration of the polarities toward a specific portion. However, this alternate method requires a change in the design of the data driver, which causes a material cost to be increased and a yield to be decreased, compared with the exemplary embodiments of the present disclosure in which the configuration of the transmission lines is changed.

It is essentially required that all the transmission lines should be insulated from each other, which is equally applied to the crossing transmission lines of the first transmission part. Hereinafter, a vertical structure of the transmission lines designed to cross and be insulated from each other will be described with respect to the first transmission part.

Figure 6A:
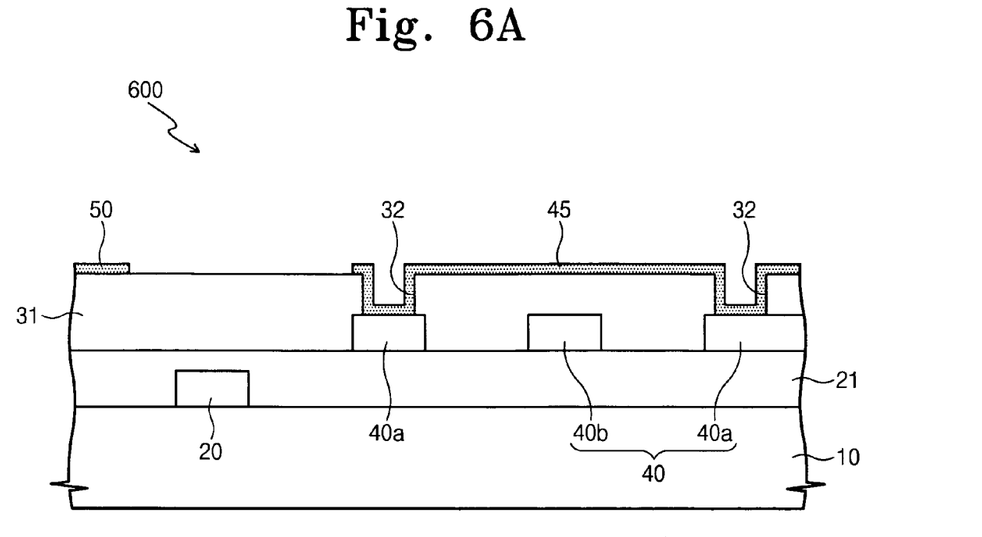
FIGS. 6A and 6B are cross-sectional views taken along lines A-A' and B-B' of FIG. 1, respectively.
Figure 6B:
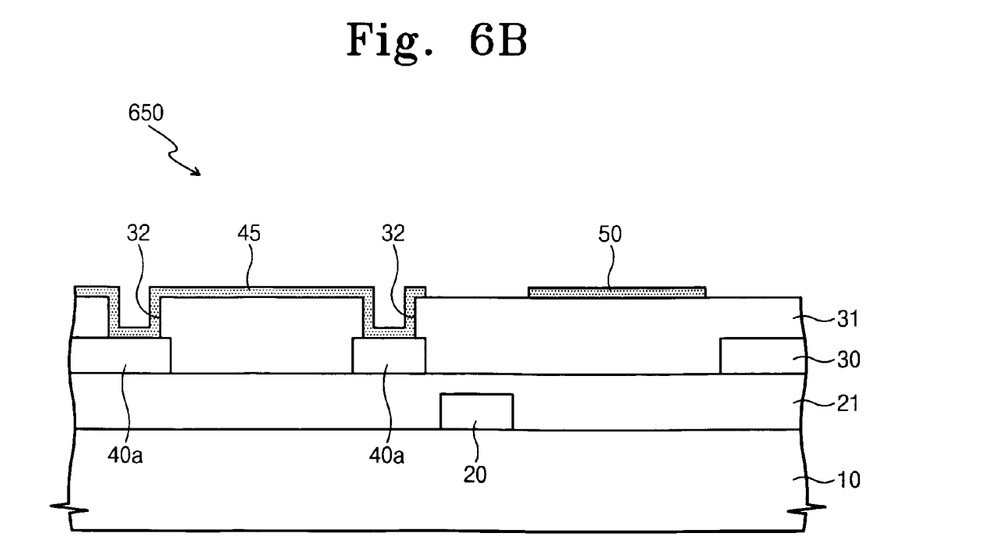

FIGS. 6A and 6B are cross-sectional views taken along the lines A-A' and B-B' of FIG. 1, respectively. FIGS. 6A and 6B show a vertical structure of a first transmission part 600 and a second transmission part 650, respectively.

Referring to FIG. 6A, transmission lines 40 crossing a gate line 20 are formed on a substrate 10. The gate line 20 is insulated from the transmission lines 40 by a gate insulating layer 21 interposed therebetween. The transmission lines 40 are formed simultaneously with a data line 30 such that the transmission lines 40 are directly connected with the data line 30. Then, since the data line 30 can be generally formed of a same material as that of the gate line 20, the gate line 20 may be formed of a same material as that of the transmission lines 40. A passivation layer 31 protecting a thin film transistor and the like is formed on the transmission lines 40. The passivation layer 31 can be formed of a same material as that of the gate insulating layer 21, and also serves as an insulator. The transmission lines 40 on the gate insulating layer 21 are one pair crossing each other, and any of one pair of transmission lines 40 is opened at the crossing point such that they are insulated from each other.

Hereinafter, for the convenience of description, the two transmission lines 40 are respectively named as an opened transmission line 40a and a non-opened transmission line 40b. In the opened transmission line 40a, an opened portion is connected by a conductor 45 on the passivation layer 31 through a contact hole 32, while the non-opened transmission line 40b passes over the opened transmission line 40b. In other words, one pair of transmission lines 40 cross each other while being insulated by the non-opened transmission line 40b, the opened transmission line 40a and the conductor 45. The conductor 45 is not limited in its shape or material if it can electrically connect the opened portions. Since a pixel electrode 50 is used as the conductor on the passivation layer 31 in a preferred LCD, it is preferable that the same material as that of the pixel electrode 50 be used as the conductor 45 in terms of the fabrication process.

Again referring to FIG. 1, in addition to one pair of crossed transmission lines 40 of the first transmission part 81, any of one pair of transmission lines 40 of the second transmission part 82 is also opened. The reason why the second transmission part 82 having the transmission lines not crossed with each other has the opened transmission line 40a is to allow the opened transmission line 40a of the second transmission part 82 to be equal in resistance to the opened transmission line 40a of the first transmission part 81. As described above, the transmission lines 40 can be formed of the same material as that of the gate line 20 or the data line 30. The gate line 20 and the data line 30 can be formed of one selected from the group consisting of chromium (Cr), aluminum (Al), copper (Cu), Molybdenum (Mo) and alloys thereof, or in a multi-layer structure including two metal layers having different physical properties. In contrast, the pixel electrode 50 can be formed of a transparent conductive layer, such as indium zinc oxide (IZO) or indium tin oxide (ITO). If the conductor 45 connecting the opened portion of the first transmission part 81 is formed using the same material as that of the pixel electrode 50, the opened transmission line 40a in which the conductor 45 is used has a different resistance than the non-opened transmission line 40b. In addition, even though the conductor 45 is formed of the same metal as that of the transmission lines 40, if the transmission lines of the first transmission part 81 are different in length than the transmission lines of the second transmission part 82, their resistances become different.

Assuming that FIG. 1 shows a checkered pixel pattern, the first transmission line 40 of the second transmission part 82 and the second transmission line 40 of the second transmission part 82 all transmit data signals for the same color. However, in a case where only one of two transmission lines includes an opened portion with respect to the same color, the resistance values of the respective transmission lines become different, so that different images may be displayed on the respective sub-pixels with respect to the same data signal. To avoid such a problem, it is preferred that the second transmission part 82 has the opened transmission line 40a. At this time, the opened transmission lines 40a of the first and second transmission parts 81 and 82 are properly selected such that they become lines applying data signals to the same color sub-pixels in the first transmission part 81 and the second transmission part 82.

Next, a vertical structure in which the transmission lines 40 of the second transmission part 82 are opened will be described. Referring to FIG. 6B, the gate line 20 and the gate insulating layer 21 insulating the gate line are formed on the substrate 10. A part of the data line 30 and the opened transmission line 40a are formed on the gate insulating layer 21, and are covered with the passivation layer 31. The opened transmission line 40a has a partially opened portion and the partially opened portion is connected with the conductor 45 on the passivation layer 31 through a contact hole 32. The pixel electrode 50 is also formed on the passivation layer 31, and the conductor 45 can be formed of the same material as that of the pixel electrode 50.

In general, the resistance is proportional to the resistivity and length with respect to a medium but is inversely proportional to an area. Considering the above fact, in order to keep the resistances of the first transmission part 81, the second transmission part 82 and the opened transmission line 40a at constant values, the second transmission part 82 should be formed with an opened portion and also the material, length and line width of the conductor 45 connecting the opened portions should be properly adjusted. For instance, in case the conductors of the respective transmission parts 81 and 82 are formed of the same material, the areas and lengths of the conductors can be made to be substantially equal to each other, or in case any one of the conductors is longer than the other, the longer conductor 45 can be adjusted so as to have a narrow line width.

Hereinafter, a method of fabricating an LCD having the above construction will be described. FIGS. 7A through 10A are cross-sectional views taken along the line A-A' of FIG. 1, indicated generally by the reference numerals 700, 800, 900 and 1000, respectively, and FIGS. 7B through 10B are cross-sectional views taken along the line B-B' of FIG. 1, indicated generally by the reference numerals 750, 850, 950 and 1050, respectively. The cross-sectional views 700, 800, 900 and 1000 taken along the line A-A', and the cross-sectional views 750, 850, 950 and 1050 taken along the line B-B', illustrate a method of fabricating an LCD according to an exemplary embodiment of the present disclosure.

Figure 7A:
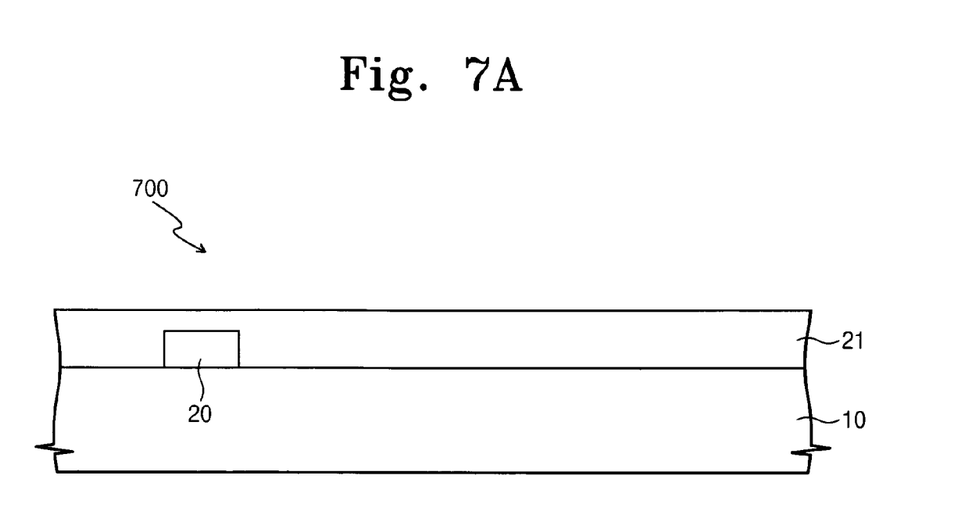
Figure 7B:
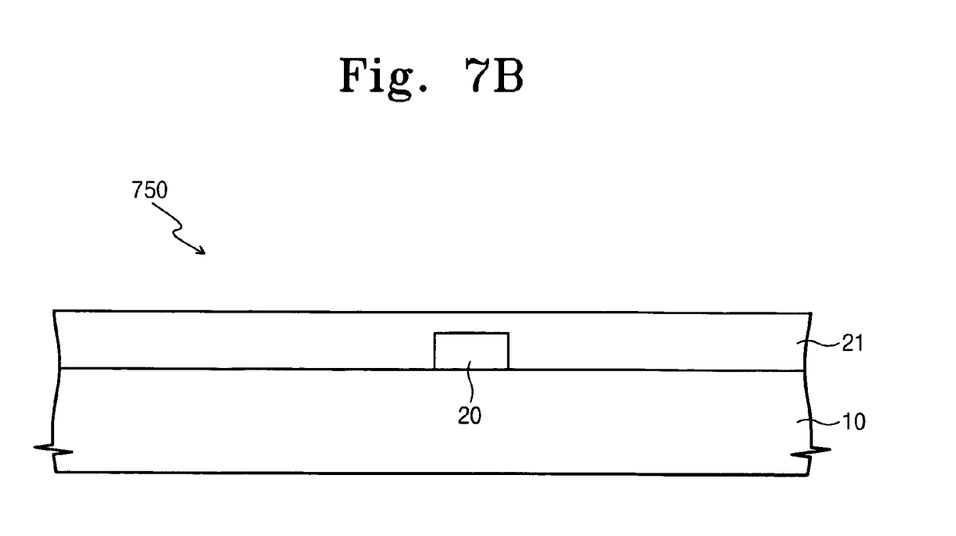

Referring to FIGS. 7A and 7B, a gate line 20 and a gate insulating layer 21 covering the gate line 20 are formed on a substrate 10. The substrate 10 can be an insulator substrate, such as a transparent glass substrate or a transparent plastic substrate. The gate line 20 is formed by depositing a metal film using a sputtering, and patterning the deposited metal film. The gate insulating layer 21 can be formed by a chemical vapor deposition using silicon nitride (SiNx) or silicon oxide (SiOx).

Figure 8A:
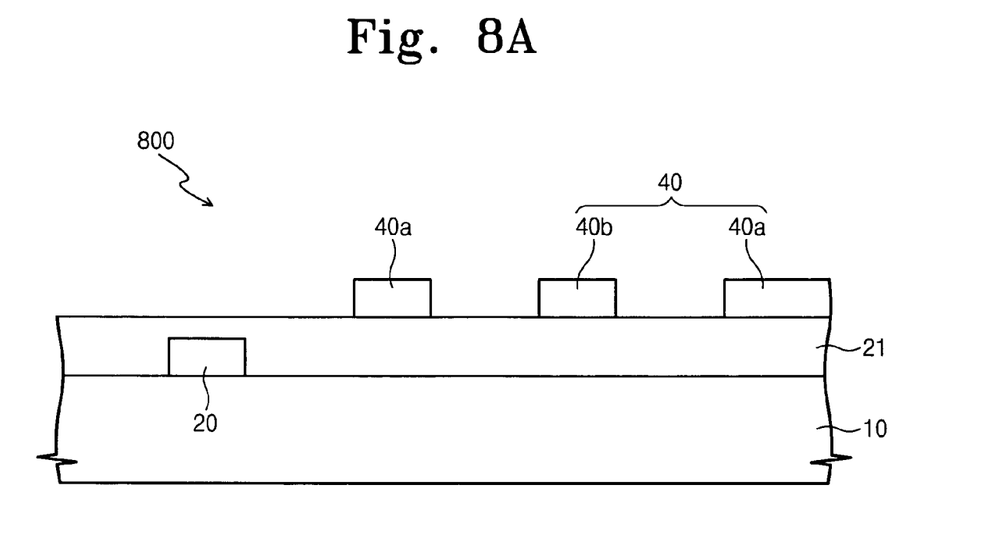
Figure 8B:
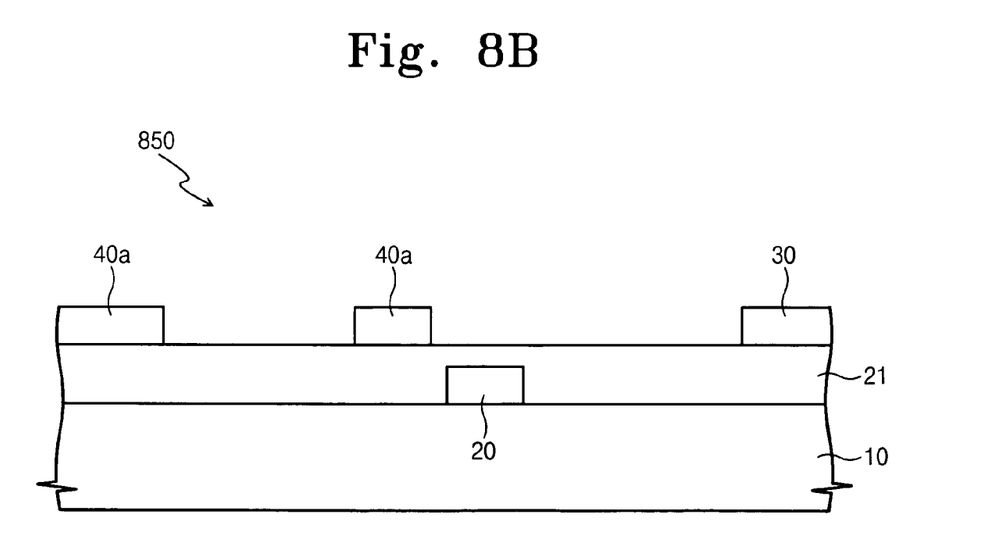

Referring to FIGS. 8A and 8B, a data line 30 and transmission lines 40 are formed on the gate insulating layer 21. The data line 30 and the transmission lines 40 connected with the data line 30 are substantially simultaneously formed by depositing and patterning a metal film on an entire surface of the gate insulating layer 21. The transmission lines 40 include an opened transmission line 40*a*, of which a predetermined portion is opened, and a non-opened transmission line 40*b*, of which a corresponding predetermined portion is not opened. In a first transmission part 81 of FIG. 1, any of one pair of transmission lines that cross each other is opened at a crossing point, and in a second transmission part 82 of FIG. 1, any of one pair of transmission lines that do not cross each other is opened at a predetermined portion thereof.

A semiconductor layer of an amorphous silicon layer is formed at a crossing point between the gate line 20 and the data line 30 before the data line 30 and the like are formed. In addition, a gate electrode extending from the gate line 20 and a source electrode extending from the data line 30 are formed below and above the semiconductor layer, respectively, so that a thin film transistor is completed.

Figure 9A:
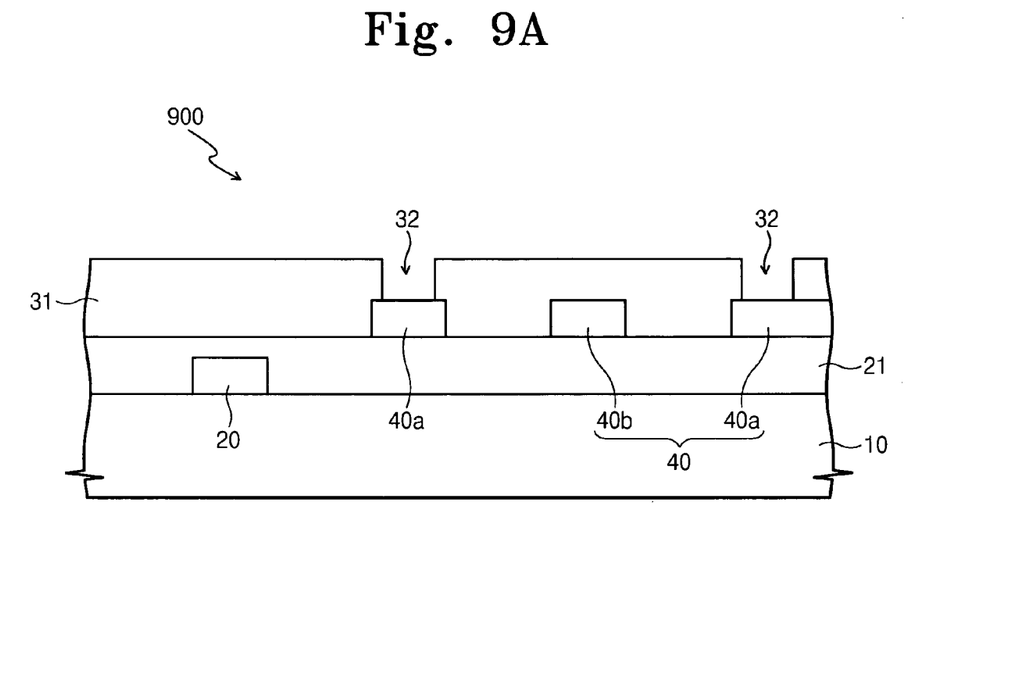
Figure 9B:
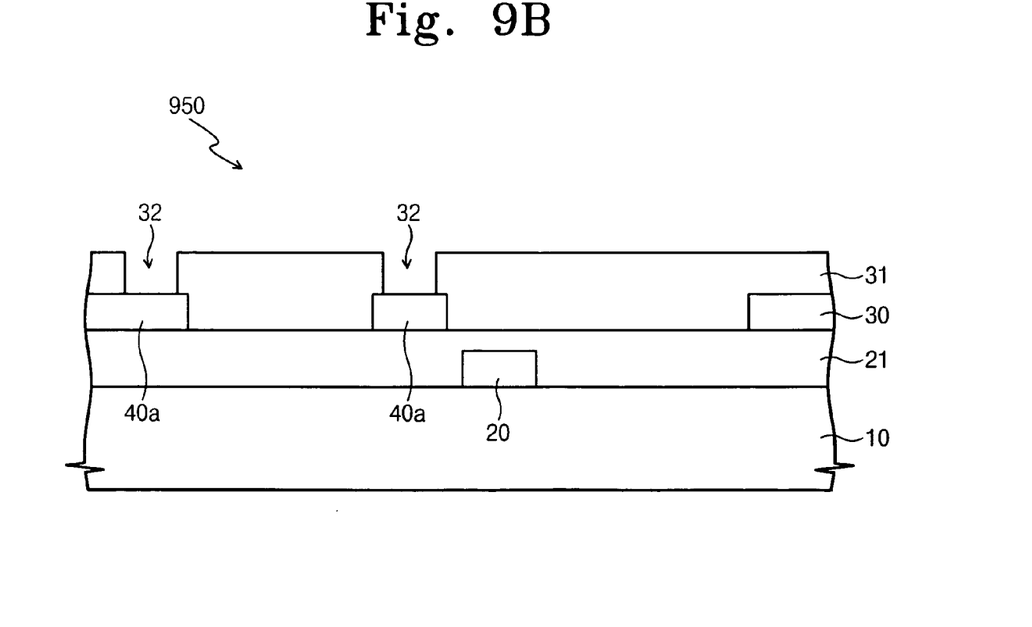

Referring to FIGS. 9A and 9B, a passivation layer 31 is deposited on an entire surface of the resultant substrate 10 to cover the data line 30 and the transmission lines 40. The passivation layer 31 can be formed by a chemical vapor deposition using silicon nitride or the like, much like the gate insulating layer 21. The passivation layer 31 is then patterned by a photolithography process to form a contact hole 32 at a predetermined portion thereof. The contact hole 32 is used to electrically connect a pixel electrode 50 formed on the passivation layer 31 in a subsequent process with the thin film transistor. In addition to the above contact hole, another contact hole used as a path for electrically connecting the opened portion of the transmission lines 40 is formed during the above patterning process.

Figure 10A:
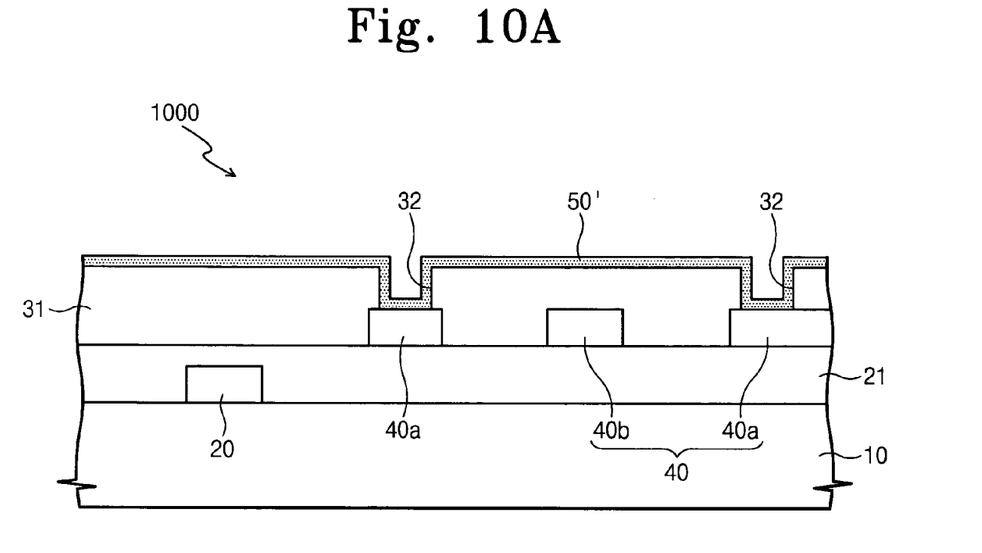
Figure 10B:
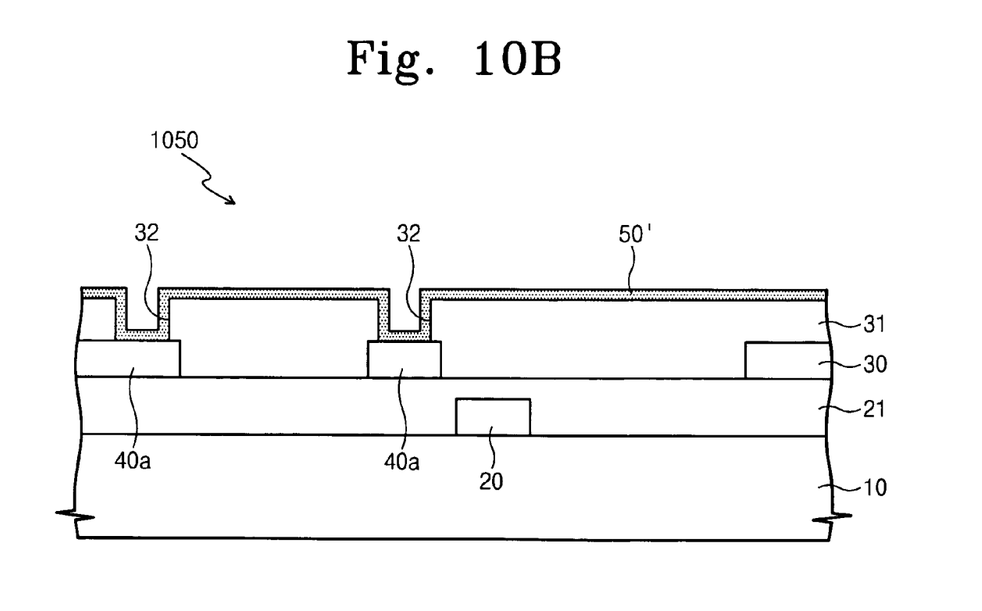

Referring to FIGS. 10A and 10B, a transparent conductive layer 50' is deposited on the passivation layer 31 using IZO or the like. The transparent conductive layer 50' is filled in the contact hole 32 and is directly contacted with an upper surface of the opened transmission line 40*a*.

Thereafter, the transparent conductive layer 50' is patterned to form a conductor 45 connecting the pixel electrode 50 and a conductor 45 connecting the opened portion of the opened transmission line 40*a*, so that the resultant substrates shown in FIGS. 6A and 6B are completed. The pixel electrode 50 is formed every sub-pixel such that the sub-pixel is separated from an adjacent sub-pixel thereto, and is connected with the thin film transistor through the contact hole. In addition, the transparent conductive layer 50' is partially remained on the opened portion of the opened transmission line 40*a* such that the opened portion is electrically connected. To connect the opened portion using the conductor 45 that is different from the IZO or the like, a further process to deposit and pattern a separate metal film is needed before or after the pixel electrode 50 is formed.

An exemplary method of fabricating the LCD according to the present disclosure has been described with reference to the accompanying drawings. Since the above method is one of a variety of methods for fabricating the LCD shown in FIG. 1A, the LCD may be fabricated by alternate methods. Preferably, the fabrication method according to the present disclosure uses the same material as that of the pixel electrode so as to form the conductor for connecting the opened portion of the transmission line such that the opened portion is connected while the pixel electrode is formed, thereby simplifying the fabrication method.

As described above according to exemplary embodiments of the present disclosure, in an LCD having four color sub-pixels, a data signal having the alternate positive polarity and negative polarity can be uniformly applied to sub-pixels with the same color by using transmission lines crossing each other. Accordingly, the picture quality can be prevented from being lowered due to a concentration of the same polarities on a specific portion.

In addition, in forming the transmission lines crossing each other, any of the transmission lines is opened at a crossing point, and the opened portion is electrically connected during the formation of the pixel electrode. Thereby, an additional process for connecting the opened portion is not needed, so that the fabrication process is simplified.

It will be apparent to those of ordinary skill in the pertinent art that various modifications and variations can be made in the exemplary embodiments of the present disclosure. Thus, it is intended that the present invention covers all such modifications and variations that come within the scope of the appended claims and their equivalents.

What is claimed is:

1. A liquid crystal display comprising:
   a plurality of gate lines formed on a substrate;
   a plurality of data lines formed on the substrate and intersecting with the gate lines to define a plurality of sub-pixels; and
   a transmission part including a plurality of transmission lines connected with the data lines to transmit a data signal, at least one pair of the transmission lines being arranged to cross each other.

2. The liquid crystal display of claim 1, wherein the transmission part comprises a first transmission part including at least one pair of the transmission lines crossing each other and a second transmission part including at least one pair of the transmission lines that do not cross each other.

3. The liquid crystal display of claim 2, wherein the sub-pixels comprise two or more sub-pixels constituting a main pixel, and the first transmission part and the second transmission part are alternatively arranged in each main pixel in a gate line direction.

4. The liquid crystal display of claim 3, further comprising a passivation layer covering the data lines and the transmission part, and a pixel electrode on the passivation layer corresponding to each sub-pixel.

5. The liquid crystal display of claim 4, wherein any of one pair of the transmission lines of the first transmission part is partially opened at a crossing point of the transmission lines, further comprising a first conductor connecting the opened portion on the passivation layer.

6. The liquid crystal display of claim 5, wherein the first conductor comprises a same material as that of the pixel electrode.

7. The liquid crystal display of claim 5, wherein any of one pair of the transmission lines of the second transmission part is partially opened at not a crossing point of the transmission lines, further comprising a second conductor connecting the opened portion on the passivation layer.

8. The liquid crystal display of claim 7, wherein the first conductor has a same resistance value as that of the second conductor.

9. The liquid crystal display of claim 7, wherein the first and second conductors comprise a same material as that of the pixel electrode.

10. The liquid crystal display of claim 3, further comprising a data driver generating data signals, wherein the data signals are applied to the data lines in a changed sequence by the transmission lines crossing each other.

11. The liquid crystal display of claim 10, wherein the main pixel comprises 1 by 4 sub-pixels arranged in the gate line direction.

12. The liquid crystal display of claim 10, wherein the main pixel comprises 2 by 2 sub-pixels arranged in the gate line direction and a data line direction.

13. The liquid crystal display of claim 10, wherein the main pixel comprises the four sub-pixels expressing red, green, blue and white colors, respectively.

14. A method of fabricating a liquid crystal display, the method comprising:
    forming a plurality of gate lines on a substrate;
    forming a plurality of data lines crossing the gate lines on the substrate; and
    forming a plurality of transmission line connected with the data lines, at least one pair of the transmission lines being arranged to cross each other.

15. The method of claim 14, wherein the transmission lines comprise at least one pair of transmission lines crossing each other and at least one pair of transmission lines that do not cross each other.

16. The method of claim 14, wherein the data lines and the transmission lines are substantially simultaneously formed by depositing and patterning a metal film.

17. The method of claim 16, further comprising:
    forming an insulating layer on the data lines and the transmission lines;
    depositing a transparent conductive layer on the insulating layer; and
    patterning the deposited transparent conductive layer to form a pixel electrode.

18. The method of claim 17, wherein the metal film is patterned so any of one pair of the transmission lines crossing each other is partially opened at a crossing point of the pair of the transmission lines, and the transparent conductive layer is patterned so the opened portion is connected.

19. The method of claim 18, wherein the transparent conductive layer is substantially simultaneously patterned when the pixel electrode is formed.

20. The method of claim 19, wherein the metal film is patterned so any of one pair of the transmission lines that do not cross each other is partially opened, and the transparent conductive layer is substantially simultaneously patterned when the pixel electrode is formed to connect the opened portion.

* * * * *